Patented June 5, 1923.

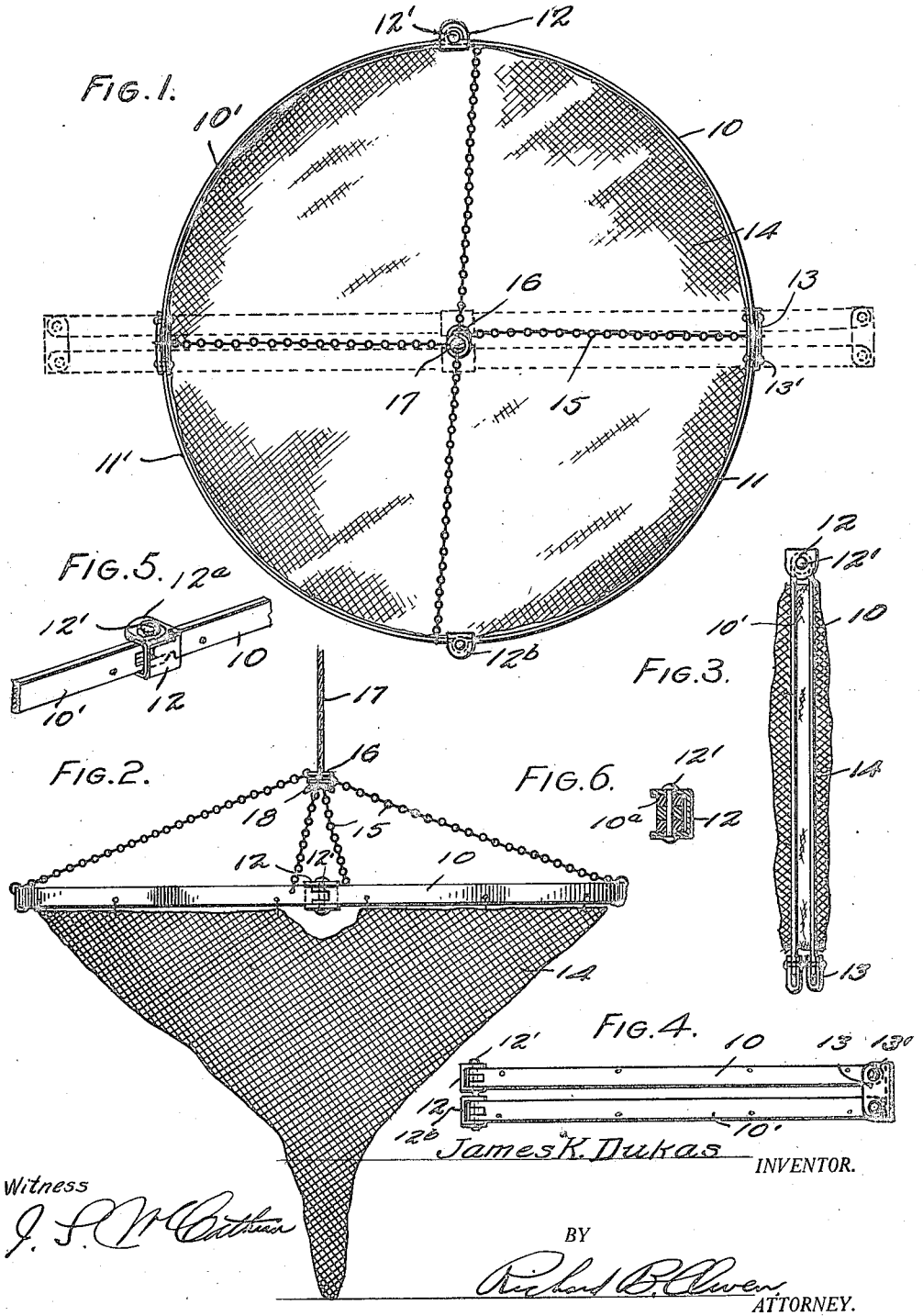

1,457,886

UNITED STATES PATENT OFFICE.

JAMES K. DUKAS, OF EDWARDSVILLE, PENNSYLVANIA.

FISHING NET.

Application filed August 10, 1920. Serial No. 402,526.

*To all whom it may concern:*

Be it known that I, JAMES K. DUKAS, a citizen of the United States, residing at 509 Main Street, Edwardsville, in the county of Luzerne and State of Pennsylvania, have invented certain new and useful Improvements in Fishing Nets, of which the following is a specification.

This invention relates to a fishing net and has for its object the production of a simple and efficient net which may be readily and conveniently folded so that the same may be conveniently and easily carried or packed away for shipment or storage.

Another object of this invention is the production of a simple and efficient means for supporting the frame of the fishing net in an operative position.

With these and other objects in view this invention consists of certain novel constructions, combinations and arrangement of parts as will be hereinafter fully described and claimed.

In the drawing:

Figure 1 is a top plan view of the net in an open position, a partly folded position being shown in dotted lines.

Figure 2 is a side elevation of the structure shown in Figure 1.

Figure 3 is a top plan view of the net and frame in a folded position.

Figure 4 is a side elevation of the frame shown in Figure 3.

Figure 5 is a detailed perspective view of the hinge connection between two of the sections of the frame of the net and Figure 6 is a vertical section through the hinge connection shown in Figure 5.

By referring to the drawings it will be seen that the frame of the net comprises a substantially circular band formed of a section 10, a section 10′, and section 11, and a section 11′. The sections 10 and 10′ are provided at their adjoining ends with rolled eye portions $10^a$, the eye portion of the section 10 fitting between two of the eye portions of section 10′ as shown in Figure 5. A suitable shield yoke 12 is used in connection with the hinge joint connection and comprises a substantially U-shaped body, and is secured to the sections 10 and 10′ by means of a pintle or pivot pin 12′ which extends through the ears $12^a$ of the shield yoke 12 and the eye portion $10^a$ of the sections 10 and 11. A similar yoke $12^b$ is used for the purpose of protecting the hinge joint connection between the sections 11 and 11′ which are similarly constructed to the sections 10 and 10′. All of the sections 10, 10′, 11, 11′ are formed of flexible metal preferably of a spring-like structure, to permit the same to constitute a circular frame for supporting the net 14 which net 14 is secured in any suitable or desired manner to the lower edge of the respective sections of the frame. The adjoining ends of the sections 10 and 11 as well as the sections 10′ and 11′ are connected by means of a channel clip 13 forming a guard member which is substantially U shaped in structure, the respective ends of the sections being pivotally secured thereto by means of pivot pins 13′ which firmly hold the ends of the sections between the respective leaves of the channel clips 13.

Suitable supporting chains 15 are secured at convenient points along the top of the frame and carry suitable eyes 16 at the upper ends, through eyes 16 pass a suitable supporting cord or cable 17, having a knot 18 formed at the lower end thereof to prevent the cord 17 from slipping therethrough. In this way an efficient support of usual construction will be provided for supporting the frame in a desired position.

When it is desired to fold the frame, the sections 10 and 10′ are swung towards the sections 11 and 11′ upon their respective pivot pins 13′ until the sections assume the position shown in dotted line in Figure 1. The adjoining sections 10 and 11 may then be swung backwardly to lie in close engagement with the adjoining sections 10′ and 11′ such as shown in Figures 3 and 4 of the drawing and the body portion of the net may be then wound upon the same, in this way producing a very compact structure for shipment. The shield yoke 12 will prevent the body portion of the net from catching into the hinge connections which are pivotally secured together by means of the pin or pintle 12′.

It of course should be understood that certain detailed changes in mechanical construction may be employed in the present invention without departing from the spirit of the invention so long as these changes fall within the scope of the appended claim.

What is claimed is:—

A collapsible net frame comprising two pair of sections, the sections in each pair being pivoted to each other at adjacent ends, guard means for said pivot points, and U-shaped members to which are pivoted the other ends of the sections so that they may swing in a plane at right angles to the first plane.

In testimony whereof I affix my signature in presence of two witnesses.

JAMES K. DUKAS.

Witnesses:
WM. I. WILLIAMS,
WM. L. MORGAN.